(12) United States Patent
Kaganoi

(10) Patent No.: US 6,772,269 B1
(45) Date of Patent: Aug. 3, 2004

(54) BUS SWITCH AND BUS SWITCH SYSTEM FOR INCREASED DATA TRANSFER

(75) Inventor: Teruo Kaganoi, Tokyo (JP)

(73) Assignee: NEC Corporation (JP)

( * ) Notice: Subject to any disclaimer, the term of this patent is extended or adjusted under 35 U.S.C. 154(b) by 446 days.

(21) Appl. No.: 09/704,628

(22) Filed: Nov. 2, 2000

(30) Foreign Application Priority Data

Nov. 5, 1999 (JP) .......................................... 11-314606

(51) Int. Cl.[7] .......................................... G06F 13/36
(52) U.S. Cl. ...................... 710/310; 710/305; 710/65; 370/222; 370/402; 709/251
(58) Field of Search .............................. 710/305–313, 710/65–66; 709/251; 370/221–224, 400–406

(56) References Cited

U.S. PATENT DOCUMENTS

| | | | | |
|---|---|---|---|---|
| 4,346,440 A | * | 8/1982 | Kyu et al. ................... | 709/236 |
| 4,646,232 A | * | 2/1987 | Chang et al. ............... | 710/113 |
| 4,768,190 A | * | 8/1988 | Giancarlo ................... | 370/400 |
| 4,777,591 A | * | 10/1988 | Chang et al. ................ | 712/40 |
| 4,866,421 A | * | 9/1989 | Szczepanek ........... | 340/825.52 |
| 5,235,595 A | * | 8/1993 | O'Dowd ..................... | 370/392 |
| 5,374,926 A | * | 12/1994 | Szczepanek ........... | 340/825.52 |
| 5,596,724 A | * | 1/1997 | Mullins et al. ............... | 710/71 |
| 5,822,553 A | * | 10/1998 | Gifford et al. .............. | 710/305 |
| 6,091,705 A | * | 7/2000 | Regula ........................ | 370/223 |

FOREIGN PATENT DOCUMENTS

| | | |
|---|---|---|
| EP | 0 150 084 B1 | 1/1985 |
| JP | 4-157896 | 5/1992 |
| JP | 10-228445 | 8/1998 |
| JP | 11 177560 | 7/1999 |

OTHER PUBLICATIONS

Japanese Office Action issued Jun. 11, 2002 (w/ English translation of relevant portions).
Canadian Office Action issued Sep. 9, 2003.

* cited by examiner

*Primary Examiner*—Sumati Lefkowitz
(74) *Attorney, Agent, or Firm*—Dickstein, Shapiro, Morin & Oshinsky, LLP.

(57) ABSTRACT

A bus switch system having an adapter, a first input and first output register in cascade connection on a data transferring bus of bus switch that comprise input and output shift registers. There is also a bridge, the second input and second output registers are in a cascade connection on the first data transferring bus form a shift register. This allows data to be transferred to an adjacent adapter at one clock cycle, thereby the data transfer is made faster. The data transfer on the first and second data transferring buses is conducted in one direction and input/output control is optimally conducted by first and second control means so that switch control in data transfer is made easier.

20 Claims, 14 Drawing Sheets

BUS SWITCH AND BUS SWITCH SYSTEM FOR INCREASED DATA TRANSFER

FIELD OF THE INVENTION

This invention relates to an adapter for bus switch, a bridge for bus switch, and a bus switch and a bus switch system. More particularly, to a bus switch and system, that control, the data transfer on a ring bus with multiple I/O (input/output) ports or data transfer between multiple ring buses.

BACKGROUND OF THE INVENTION

A conventional data transfer system is composed so that multiple nodes are connected with a bus that allows the two-way communication of data, the nodes, respectively, are connected with multiple modules that conduct different processing, and the data transfer from one module to the other module is conducted. However, in this data transfer system, since data flows in the two directions, the switching control in data transfer such as switching of transfer direction and switching of source and destination, and the extraction of transfer timing are complicated. Therefore, it is difficult to enhance the transfer speed.

Japanese patent application laid-open No. 11-177560 (1999) discloses a data transfer system that enables data to flow in the single direction on the bus.

FIG. 1 shows the data transfer system disclosed in the Japanese patent application laid-open No. 11-177560. In FIG. 1, adapters 902a to 902d are inserted into multiple positions on a ring bus, and the adapters, respectively, are connected with modules 903a to 903d that conduct different processing. The modules 903a to 903d, respectively, conduct various processing, e.g., processing of audio data, processing of image data, input/output processing with the outside of integrated circuit.

The bus 901 has an n bit (n is a natural number) bus width, which is the same as the bit width of data to be transferred. Since the bus 901 is connected in the form of a ring, data is sent, in sequence, from the adapter 902a to the adapter 902b, and then from the adapter 902b to the adapter 902c, and is returned to the adapter 902a from the adapter 902d. Thus, since data is transferred in the one direction (single direction) on the ring bus 901. The switch control of transfer becomes very easy.

FIG. 2 shows one adapter 902 in FIG. 1. Since the adapters 902a to 902d have the same composition, one adapter 902 is explained below taking as an example. The adapter 902 is composed of a flip flop 1001 (D-type flip flop), a data extract/insert circuit 1002 that is connected with the flip flop 1001, a selector 1003 that is connected with the flip flop 1001 and the data extract/insert circuit 1002, and a flip flop 1004 (D-type flip flop) that is connected with the selector 1003.

The flip flop 1001 temporarily stores data to be input from the adjacent adapter (at the previous stage in transfer sequence). The data extract/insert circuit 1002 judges whether the data being input from the flip flop 1001 is addressed to the module 903 connected therewith or not. If the data is sent to the module 903, the data extract/insert circuit 1002 extracts the data, or inserts data when the module 903 thereof outputs the data. The selector 1003 selectively outputs the data from the flip flop 1001 or the data output from the data extract/insert circuit 1002, to the next stage adapter. The selector 1003 has a function to judge whether data being input is addressed to the module connected to itself (its own adapter) or not, a function to send the data to the module connected when the data is addressed to itself and a function to insert data into a time slot transmittable when the data is output from the module connected to itself. The flip flop 1004 holds, with the system clock, data to be output to the bus 901 as the transmission line, and then outputs it to the bus 901.

Data to be transferred through the circuit in FIG. 3 is composed of "data entity", "flag" (to indicate the validity or invalidity of data) added to the head, "destination ID", and "classification". The data extract/insert circuit 1002 reads the fields of "flag" and "destination ID" in data, thereby it judges whether data being input is addressed to its own module. When the data input to the flip flop 1001 is addressed to the module 903 of its own, it is transferred to the module 903. When there is data to be output from the module 903 to the bus 901, it conducts the switch control of the selector 1003 so that the module 903 and the flip flop 1004 are communicated with each other.

The operation of the data transfer system having the composition shown in FIGS. 1 and 2 is explained below.

Data output from the flip flop 1004 for re-timing of the adapter 902a is taken into the input-side flip flop 1001 of the next-stage adapter 902b at the next transition timing of system clock. The data taken into the flip flop 1001 is input to the data extract/insert circuit 1002. The data extract/insert circuit 1003 judges, based on the content of the flag and destination ID, whether the data is sent to its own module or not. In this judgement, when it is sent to the module of its own, the type of data is analyzed based on the "classification" field added to the data, and the data is sent to the module. Simultaneously, when there is a data to be transferred to the other module from the module of its own, "classification" field and "destination ID" of a module to receive the data are added to the data. Then, setting "flag" to indicate that the data is valid, the data is output to the selector 1003. Also, even when there is no data to be transferred, if there is a transferred data in the module of its own, the flag of the data is removed and the data is, as a invalid data, output to the selector 1003. As described above, the data extract/insert circuit 1002 takes data from the flip flop 1001 when its own module 903 is the destination, and switches the selector 1003 to transfer the data from the module 903 to the flip flop 1004 when its own module 903 is the source. Furthermore, when the module 903 is not related to the input/output of data, it switches the input of the selector 1003 to the flip flop 1001, thereby data form the flip flop 1001 is passed toward the flip flop 1004. Data from the flip flop 1004 is input to the next-stage adapter 902c. The other adapters operate in like manner.

Thus, by conducting the data transfer between the flip flop of an adapter and the flip flop of another adapter, the transfer switching control and the extraction of timing can be simplified. In addition, the data transfer between modules can be performed faster.

However, in the conventional data transfer system, when the number of modules connected to one ring bus increases, since the transfer bandwidth (data transfer amount per unit time) of each module is in reverse proportion to the number of modules, the transfer bandwidth of each module becomes small. Also, when the data processing speed of each module cannot follow the data transfer amount, it is necessary to reduce the data transfer speed. Thereby, the efficiency in data transfer lowers.

SUMMARY OF THE INVENTION

Accordingly, it is an object of the invention to provide a bus switch adapter, a bus switch bridge, a bus switch and a bus switch system that increases the transfer bandwidth of each module (I/C port) thereby increasing the amount of data transferred per unit time.

It is a further object of the invention to provide a bus switch adapter, a bus switch bridge, a bus switch and a bus switch system that, even when the data processing speed of each module cannot follow the data transfer amount, it is not necessary to lower the data transfer speed.

1) According to the invention, a bus switch adapter for conducting one selected from a data taking operation that extracts data being transferred on a data transferring bus to take the data into a module such as an operating circuit and a transmit/receive circuit, a data inserting operation that inserts data output from the module into the data transferring bus, and a data transferring operation that transfers data on the data transferring bus without conducting the extracting and inserting of data, comprises:

an input register to which parallel data with a given number of bits to be transferred on the data transferring bus is input and which holds the data, the input register being of a given number of parallel bits;

an output register that holds parallel data with a given number of bits and outputs the data to the data transferring bus, the output register being of a given number of parallel bits;

an input storing means that temporarily stores the parallel data held by the input register and outputs the data to the module at a given timing;

an output storing means that temporarily stores the data output from the module and outputs the data, as the parallel data, to the output register at a given timing; and a control means that controls the outputting of the parallel data from the input register to the input storing means, the outputting of the parallel data from the output storing means to the output register, and the outputting of the parallel data from the input register to the output register.

In this composition, when the data transfer is not conducted between the data transferring bus and the module, the control means controls so that the data is passed through between the input register and the output register. Also, the control means, when the data is transferred from the data transferring bus to the module, controls so that the data taken in the input register is transferred through the input storing means to the module, and, when the data is transferred from the module to the data transferring bus, controls so that the data is stored through the output storing means into the output register and then is output to the data transferring bus at a given timing. Thus, only by locating the adapter at the connection point between each module and the data transferring bus, data is transferred to the post-stage adapter at the clock cycle of register. Therefore, the clock rate in data transfer can be sped up, and even when the number of modules increases the transfer speed on the data transferring bus does not lower. Also, even when the data processing speed of each module cannot follow the data transfer amount, it is not necessary to lower the data transfer speed.

2) According to another aspect of the invention, a bus switch bridge for conducting one selected from a data taking operation that extracts data being transferred on a first data transferring bus to take the data into a second data transferring bus, a data inserting operation that inserts data taken from the second data transferring bus into the first data transferring bus, a data transferring operation that transfers data on the first data transferring bus without conducting the extracting and inserting of data, and a data returning operation that sends data taken from the second data transferring bus back to the second data transferring bus, comprises:

an input register to which parallel data with a given number of bits to be transferred on the first data transferring bus is input and which holds the data, the input register being of a given number of parallel bits;

an output register that holds parallel data with a given number of bits and outputs the data to the first data transferring bus, the output register being of a given number of parallel bits;

an input storing means that temporarily stores the parallel data held by the input register and outputs the data to a first bridge register connected to the second data transferring bus at a given timing;

an output storing means that temporarily stores the data output from a second bridge register connected to second data transferring bus and outputs the data, as the parallel data, to the output register at a given timing; and a control means that controls the outputting of the parallel data from the input register to the input storing means, the outputting of the parallel data from the output storing means to the output register, and the outputting of the parallel data from the second bridge register to the first bridge register.

In this composition, when the data transfer is not conducted between the first data transferring bus and the second data transferring bus, the control means controls so that the data is passed through between the input register and the output register. Also, the control means, when the data is transferred from the first data transferring bus to the second data transferring bus, controls so that the data taken in the input register is transferred through the input storing means and the first bridge register to the second data transferring bus, and, when the data is transferred from the second data transferring bus to the first data transferring bus, controls so that the data is stored through the second bridge register and the output storing means into the output register and then is output to the first data transferring bus from the output register. Thus, only by locating the bridge at the connection point between the first data transferring bus and the second data transferring bus, the connection with the other ring bus is enabled, therefore the modules can be distributed to the other data transferring bus through the bridge. As a result, even when the number of modules connected to the bus increases, the transfer bandwidth of each module does not reduce, therefore the data transfer speed does not lower.

3) According to another aspect of the invention, provided is a bus switch for extracting data being transferred on a data transferring bus to input the data through an adapter to a module such as an operating circuit and a transmit/receive circuit, and for inserting data output from the module into the data transferring bus through the adapter, wherein the adapter comprises:

an input register to which parallel data with a given number of bits to be transferred on the data transferring bus is input and which holds the data, the input register being of a given number of parallel bits;

an output register that holds parallel data with a given number of bits and outputs the data to the data transferring bus, the output register being of a given number of parallel bits;

an input storing means that temporarily stores the parallel data held by the input register and outputs the data to the module at a given timing;

an output storing means that temporarily stores the data output from the module and outputs the data, as the parallel data, to the output register at a given timing; and a control means that controls the outputting of the parallel data from the input register to the input storing means, the outputting of the parallel data from the output storing means to the output register, and the outputting of the parallel data from the input register to the output register.

In this composition, when the data is transferred from the data transferring bus to the module, the data taken in the input register is transferred through the input storing means to the module, and, when the data is transferred from the module to the data transferring bus, the data is stored through the output storing means into the output register and then is output to the data transferring bus. Thus, the data transfer to/from the data transferring bus is conduced through the register. Therefore, the clock rate in data transfer can be sped up. Also, even when the data processing speed of each module cannot follow the data transfer amount, it is not necessary to lower the data transfer speed.

4) According to another aspect of the invention, provided is a bus switch system for connecting a first data transferring bus and a second data transferring bus through a bridge and for transferring data between the first data transferring bus and the second data transferring bus, wherein the bridge comprises:

an input register to which parallel data with a given number of bits to be transferred on the first data transferring bus is input and which holds the data, the input register being of a given number of parallel bits;

an output register that holds parallel data with a given number of bits and outputs the data to the first data transferring bus, the output register being of a given number of parallel bits;

an input storing means that temporarily stores the parallel data held by the input register and outputs the data to a first bridge register connected to the second data transferring bus at a given timing;

an output storing means that temporarily stores the data output from a second bridge register connected to second data transferring bus and outputs the data, as the parallel data, to the output register at a given timing; and a control means that controls the outputting of the parallel data from the input register to the input storing means, the outputting of the parallel data from the output storing means to the output register, and the outputting of the parallel data from the second bridge register to the first bridge register.

In this composition, when the data is transferred from the first data transferring bus to the second data transferring bus, the data taken in the input register of the bridge is transferred through the input storing means and first bride register is the second data transferring bus. Also, when the data is transferred from the second data transferring bus to the first data transferring bus, the data taken in the first bridge register is transferred through the output storing means and the output register to the first data transferring bus. Thus, the data transfer between the first and second data transferring buses is conduced through the register. Therefore, the clock rate in data transfer can be sped up, and even when the number of modules connected on the first data transferring bus increases, the transfer speed does not lower. Further, even when the number of modules connected to the first data transferring bus comes to the limit, arbitrary number of buses can be connected each other. This gives such a state as one big ring bus is formed. Therefore, neither the transfer speed nor the transfer bandwidth lowers.

5) According to another aspect of the invention, provided is a bus switch system for connecting, through a bridge, a first data transferring bus and a second data transferring bus that transfer data to be extracted and inserted from a module such as an operating circuit and a transmit/receive circuit through an adapter, wherein, the adapter comprises a first input register to which parallel data with a given number of bits to be transferred on the first data transferring bus is input and which holds the data, the first input register being of a given number of parallel bits: a first output register that holds parallel data with a given number of bits and outputs the data to the first data transferring bus, the first output register being of a given number of parallel bits; a first input storing means that temporarily stores the parallel data held by the first input register and outputs the data to the module at a given timing; a first output storing means that temporarily stores the data output from the module and outputs the data, as the parallel data, to the first output register at a given timing; and a control means that controls the outputting of the parallel data from the first input register to the first input storing means; the outputting of the parallel data from the first output storing means to the first output register, and the outputting of the parallel data from the first input register to the first output register; and the bridge comprises: a second input register to which parallel data with a given number of bits to be transferred on the first data transferring bus is input and which holds the data, the second input register being of a given number of parallel bits; a second output register that holds parallel data with a given number of bits and outputs the data to the first data transferring bus, the second output register being of a given number of parallel bits; a second input storing means that temporarily stores the parallel data held by the second input register and outputs the data to a first bridge register connected to the second data transferring bus at a given timing, a second output storing means that temporarily stores the data output from a second bridge register connected to second data transferring bus and outputs the data, as the parallel data, to the second output register at a given timing; and a control means that controls the outputting of the parallel data from the second input register to the second input storing means, the outputting of the parallel data from the second output storing means to the second output register, the outputting of the parallel data from the first input register to the second output register, and the outputting of the parallel data from the second bridge register to the first bridge register.

In this composition, with the adapter, when the data is transferred from the first data transferring bus to the module, the data taken in the first input register is transferred through the first input storing means to the module. Also, when the data is transferred from the module to the first data transferring bus, the data is stored through the first output storing means into the first output register and then is output to the first data transferring bus.

With the bridge, when the data is transferred from the first data transferring bus to the second data transferring bus, the data taken in the second input register of the bridge is transferred through the second input storing means and first bride register to the second data transferring bus. Also, when the data is transferred from the second data transferring bus to the first data transferring bus, the data taken in the first bridge register is transferred through the second output storing means and the second output register to the first data transferring bus.

Thus, the data transfer on the first data transferring bus and between the first and second data transferring buses is conduced through the register. Therefore, the clock rate in data transfer can be sped up, and even when the number of modules connected on the first data transferring bus increases or even when the data transfer is conducted among multiple buses, the transfer speed does not lower. Further, even when the number of modules connected to the first data transferring bus comes to the limit, arbitrary number of buses can be connected each other. This gives such a state as one big ring bus is formed. Therefore, neither the transfer speed nor the transfer bandwidth lowers. Also, even when the data processing speed of each module cannot follow the data transfer amount, it is not necessary to lower the data transfer speed.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
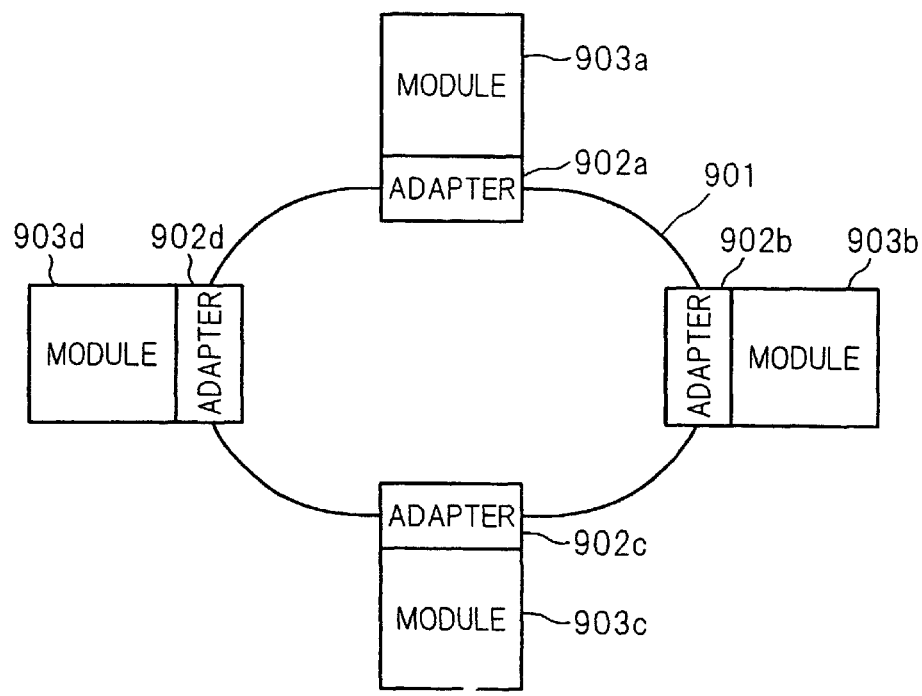
FIG. 1 is an explanatory diagram showing the composition of the conventional data transfer system.
Figure 2:
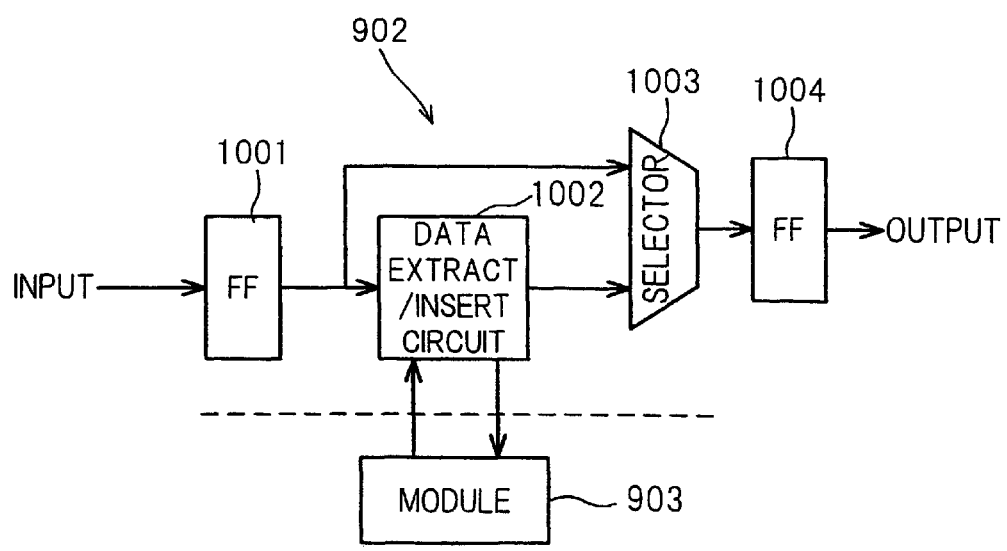
FIG. 2 is a block diagram showing the detailed composition of an adapter in FIG. 1.

The preferred embodiments of the invention will be explained below referring to the drawings.

Figure 3:
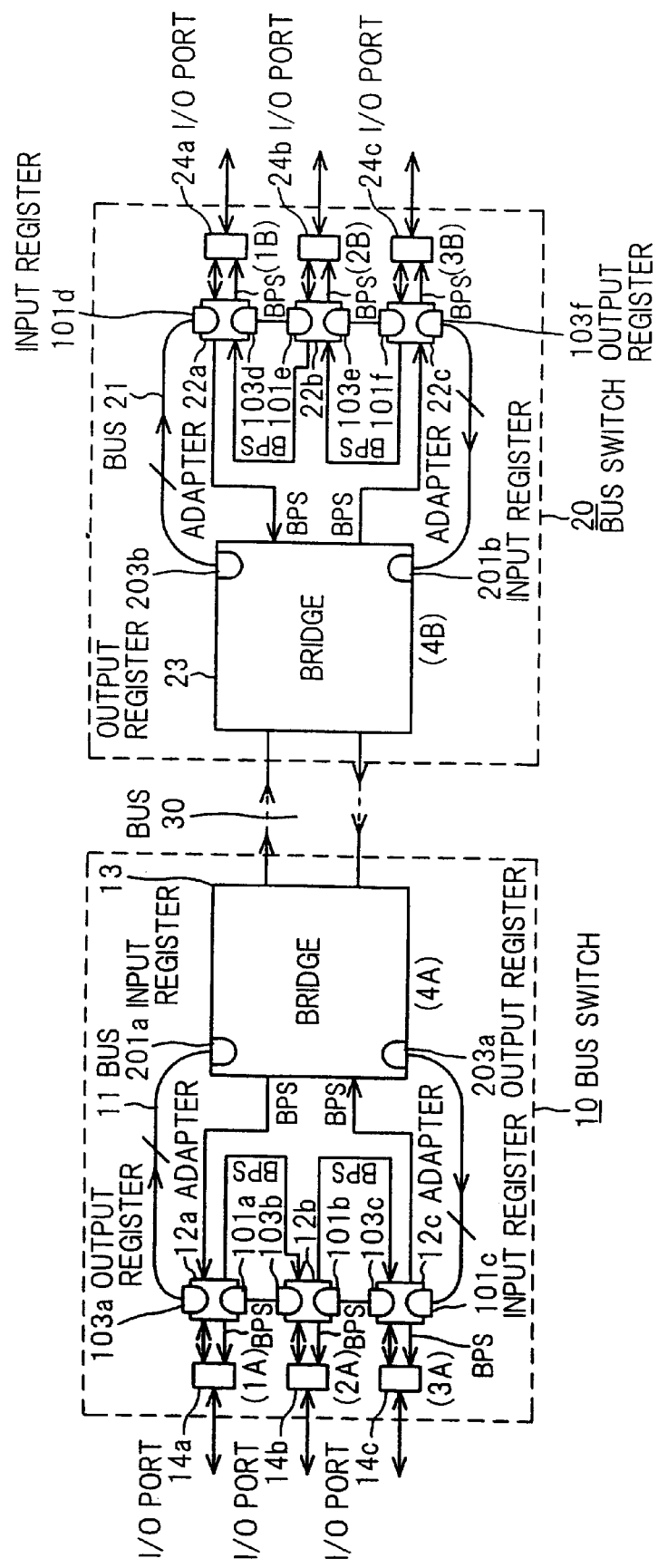
FIG. 3 is a block diagram showing a bus switch in a first preferred embodiment according to the invention.

FIG. 3 shows a bus switch system according to this invention.

A bus switch 10 and a bus switch 20 have the same composition, and are connected through a bus 30 for the connection between them. The bus switch 10 is composed of a ring bus 11 (first data transferring bus) as a bus, adapters 12a, 12b and 12c that are inserted in series into the bus 11, a bridge 13 that connects between the bus 11 and the bus 30 (second data transferring bus), and I/O ports 14a, 14b and 14c (or modules) connected to the adapters 12a, 12b and 12c, respectively. Similarly, the bus switch 20 is composed of a ring bus 21, adapters 22a, 22b and 22c that are inserted in series into the bus 21, a bridge 23 that connects between the bus 21 and the bus 30, and I/O ports 24a, 24b and 24c connected to the adapters 22a, 22b and 22c, respectively. The I/O ports 14a, 14b and 14c and I/O ports 24a, 24b and 24c, respectively, are connected with various terminal units. Ethernet switch (or Ethernet hub), router, processor unit using CFU (these are not shown) etc.

The bridge 13 and the bridge 23 have the same composition. Also, the adapters 12a, 12b and 12c and adapters 22a, 22b and 22c have the same composition. The ring buses 11, 21 each are of 32 transmission lines, e.g., when they are used to transfer 32-bit-wide data. The overall length may be such a length that requires wiring such as a cable, or may be such a short length that is formed with a wiring pattern in one LSI. In this example, the bus is formed with a wiring pattern. In case of the buses 11, 21 being formed in LSI, all the circuit composing the bus switches 10, 20 are built in the same LSI. Also, the bus 30 may have such a short length that is needed to connect between LSIs, or may be formed as long as more than several tens meters by using a coaxial cable etc. as the transmission line. The bit width of the bus 30 is to be the same as the buses 11, 21.

The input and output terminals of the adapters 12a, 12b, 12c, 22a, 22b and 22c are provided with input registers 101a to 101t and output registers 103a to 103f, respectively. Also, the input terminal of the bridge 13 and 23 is provided with input registers 201a and 201b, respectively, and the output terminal thereof is provided with output regardless 203a and 203b, respectively. The registers 101a to 101f, 103a to 103f 201a, 201b, 203a and 203b are composed of a flip flop that is 32 bits in width and 4 words in length (8×32 bits·256 bits). For convenience of explanation below, it is assumed that, with one system clock, all data stored in the respective registers are output and data on the bus is stored in the overall length of each register. However, in fact, 256 shift clocks are needed to input/output data of each register.

Figure 4:
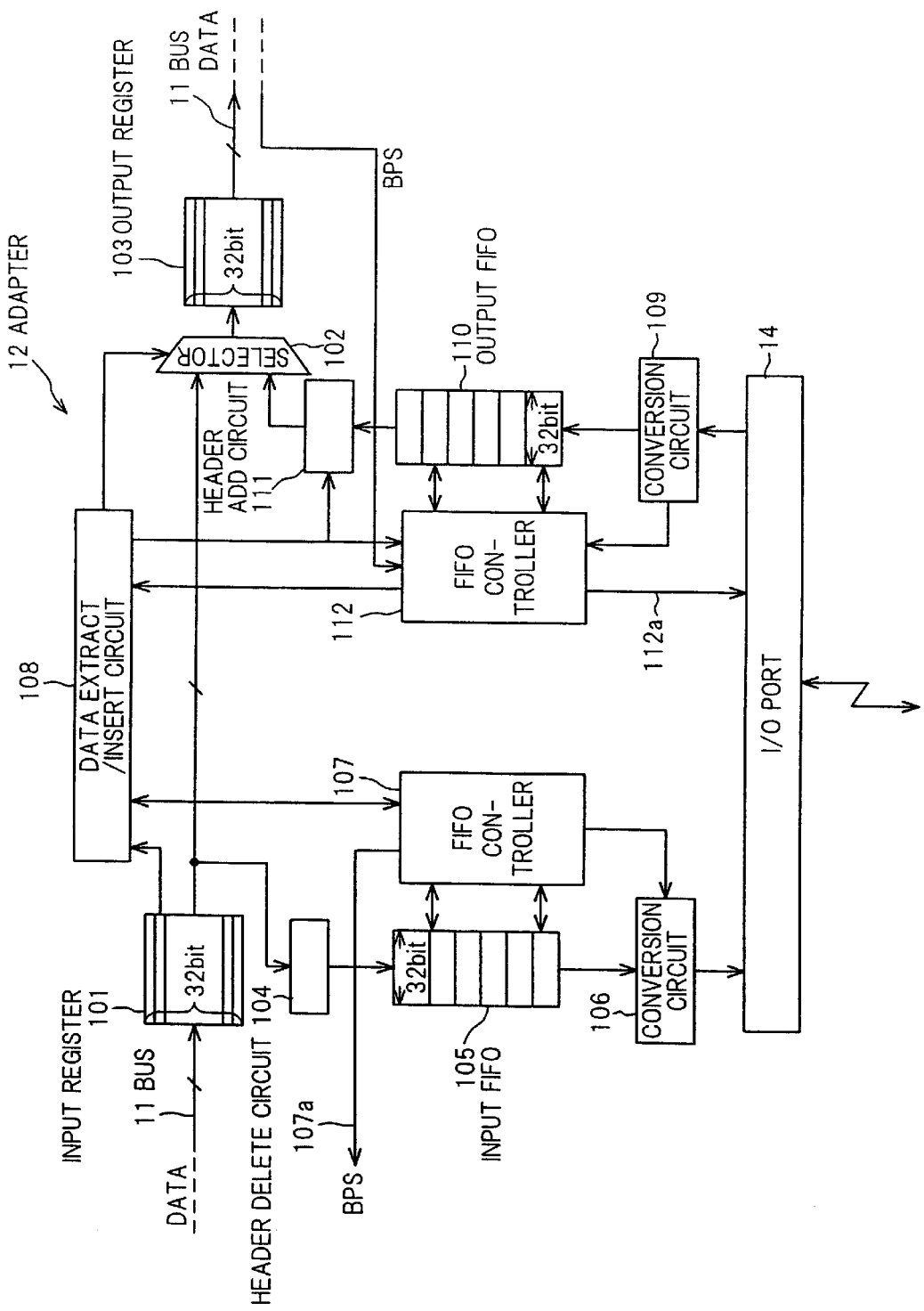
FIG. 4 is a block diagram showing the composition of an adapter in FIG. 3.

FIG. 4 shows an adapter according to the invention. The adapters 12a to 12c and the adapters 22a to 22c have the same composition. Therefore, in FIG. 4, only the composition of the adapter 12a as a representative example of the adapter 12 is shown and explained.

The adapter 12 is composed of an input register 101, a selector 102, an output register 103, a header delete circuit 104s, an input FIFO memory 105 (input storing means), a P/S (parallel/serial) conversion circuit 106, an FIFO controller 107, a data extract/insert circuit 108, an S/P (serial/parallel) conversion circuit 109, an output FIFO memory 110 (output storing means), a header add circuit 111, and an FIFO controller 112. In FIG. 4, the circuit composition of the input register 101 to FIFO controller 107 is part to transfer data from the bus 11 to the I/O port 14, the circuit composition of the S/P conversion circuit 109 to the FIFO controller 112 is part to transfer data from the I/O port 14 to the bus 11.

Meanwhile, the relation between the registers in FIG. 3 and the registers in FIG. 4 is that the input system registers 101a to 101f in FIG. 3 correspond to the input register 101 in FIG. 4 and the output registers 103a to 103f in FIG. 3 correspond to the output register 103 in FIG. 4.

The input register 101, selector 102 and output register 103 are inserted on the bus 11. The input register 101 holds data input from the bus 11, the output register 103 holds data input from the selector 102 and outputs it to the bus 11. In the selector 102, data from the input register 101 is input to its one input terminal, and information (header+data) from the header add circuit 111 is input to its another input terminal. The header delete circuit 104 deletes the header being added to the head of data input from the input register 101. The input FIFO memory 105 is used for transmit-waiting, and writes data from the header delete circuit 104 by first-in first-out. The P/S conversion circuit 106 converts parallel data (herein, 32 bits) on the bus 11 into serial data available to the I/O port 14. The FIFO controllers 107 and 112 controls the speed adjustment and the waiting between the I/O port 14 and the bus 11. The data extract/insert circuit 108 judges whether data input from the bus 11 is to be transferred to the I/O port 14 or not. If judged it is to be transferred, it transfers the data to the I/O port 14 and inserts data into a time slot transmittable when the data is sent from the I/O port 14 to the bus 11. The S/P conversion circuit 109 converts serial data on the I/O port 14 into parallel data available to the bus 11. The output FIFO memory 110 is used for transmit-waiting, and writes data from the S/P conversion circuit 109 by first-in first-out. The header add circuit 111 adds a header to the head of transferred data, and, when there is no data, sends a header including a flag to indicate that the bus 11 is in free state. Also, from the FIFO controllers 107 and 112, when data in the FIFO memory is in full state, back pressure signals (BPS) 107a and 112a to inform that no data can be currently received of the source of data are output to the adjacent adapter and the I/O port being connected, respectively. The BPS 15 is one of control lines laid along the bus 11.

Figure 5:
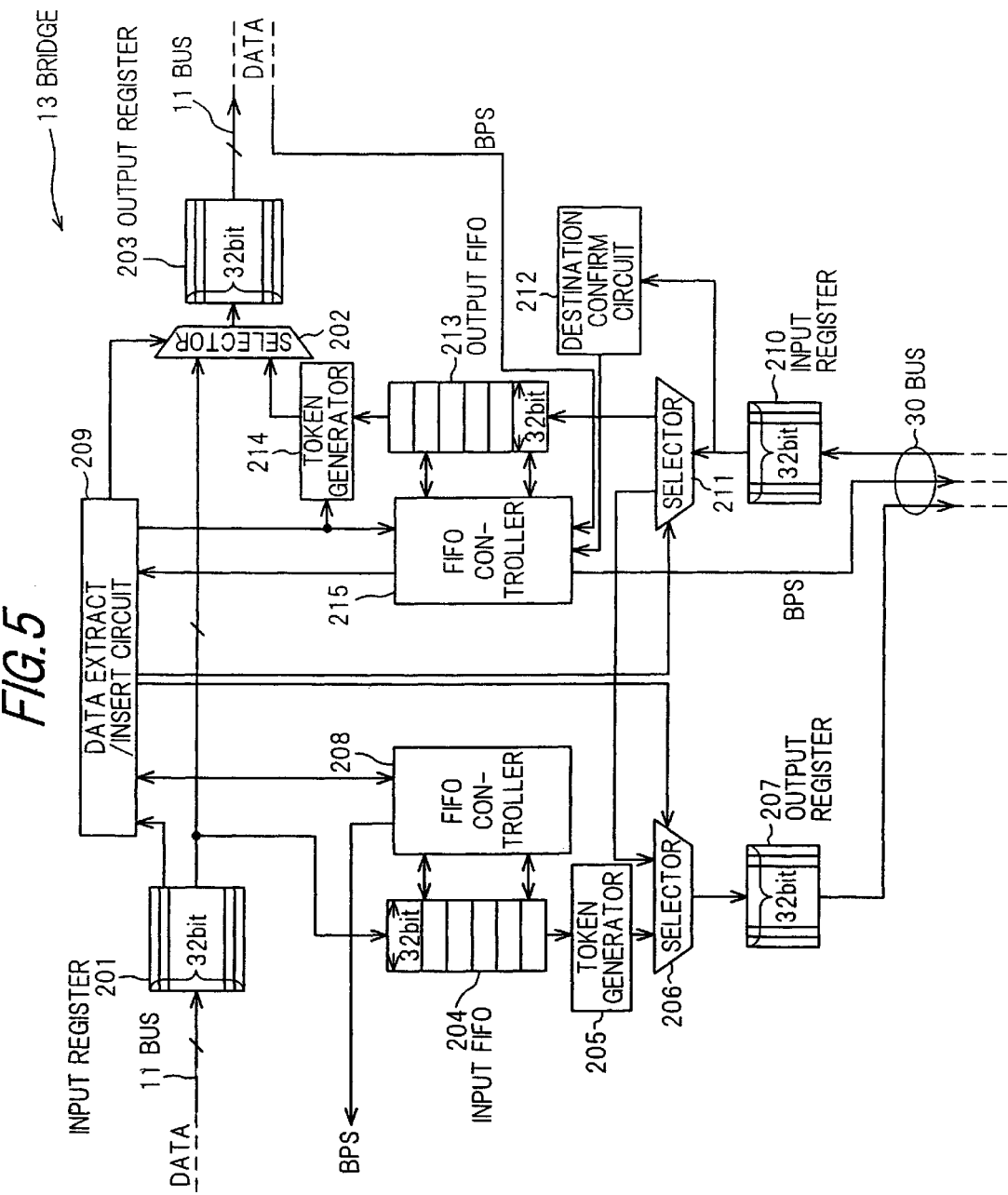
FIG. 5 is a block diagram showing the composition of a bridge in FIG. 3.

FIG. 5 shows a bridge according to the invention. The bridge 13 and the bridge 23 have the same composition. Therefore, in FIG. 5, only the composition of the bridge 13 is shown and explained. The relation between FIG. 3 and FIG. 5 is that the input registers 201a and 201b in FIG. 3 correspond to the input register 201 in FIG. 5 and the output registers 203a and 203b in FIG. 3 correspond to the output register 203 in FIG. 5.

The bridge 13 is composed of an input register 201, a selector 202, an output register 203, an input FIFO memory 204 (input storing means), a token generator 205, an output register 207, an FIFO controller 208, a selector 206, a data extract/insert circuit 209, an input register 210, a selector 211, a destination confirm circuit 312, an output FIFO memory 213 (output storing means), a token generator 214, and an FIFO controller 215. In FIG. 5, the circuit composition of the input register 201, input FIFO memory 204, token generator 205, selector 206, output register 207 and FIFO controller 208 is part to transfer data from the bus 11 to the bus 30. Also, the circuit composition of the input register 210, selector 211, destination confirm circuit 212, output FIFO memory 213, token generator 214, FIFO controller 215, selector 202, and output register 203 is part to transfer data from the bus 30 to the bus 11. Also, the circuit compositions of the input register 201, selector 202, output register 203, data extract/insert circuit 209, and token generator 214 is part to pass data from the left to right of the bus 11 in FIG. 5. Also, the circuit composition of the input register 210, selector 211, selector 206, and output register 207 is part to pass data from the bus 30 to bus 20. The registers 201, 203, 207 and 210 are composed of a flip flop.

The input register 201, selector 202 and output register 203 are connected in series, and are inserted into the bus 11. The input register 201 holds data input from the bus 11, and the output register 203 holds data input from the selector 202 and outputs it to the bus 11. In the selector 202, data from the input register 201 is input to its one input terminal and data through the token generator 214 from the output FIFO memory 213 is input to its input terminal.

Figure 12:
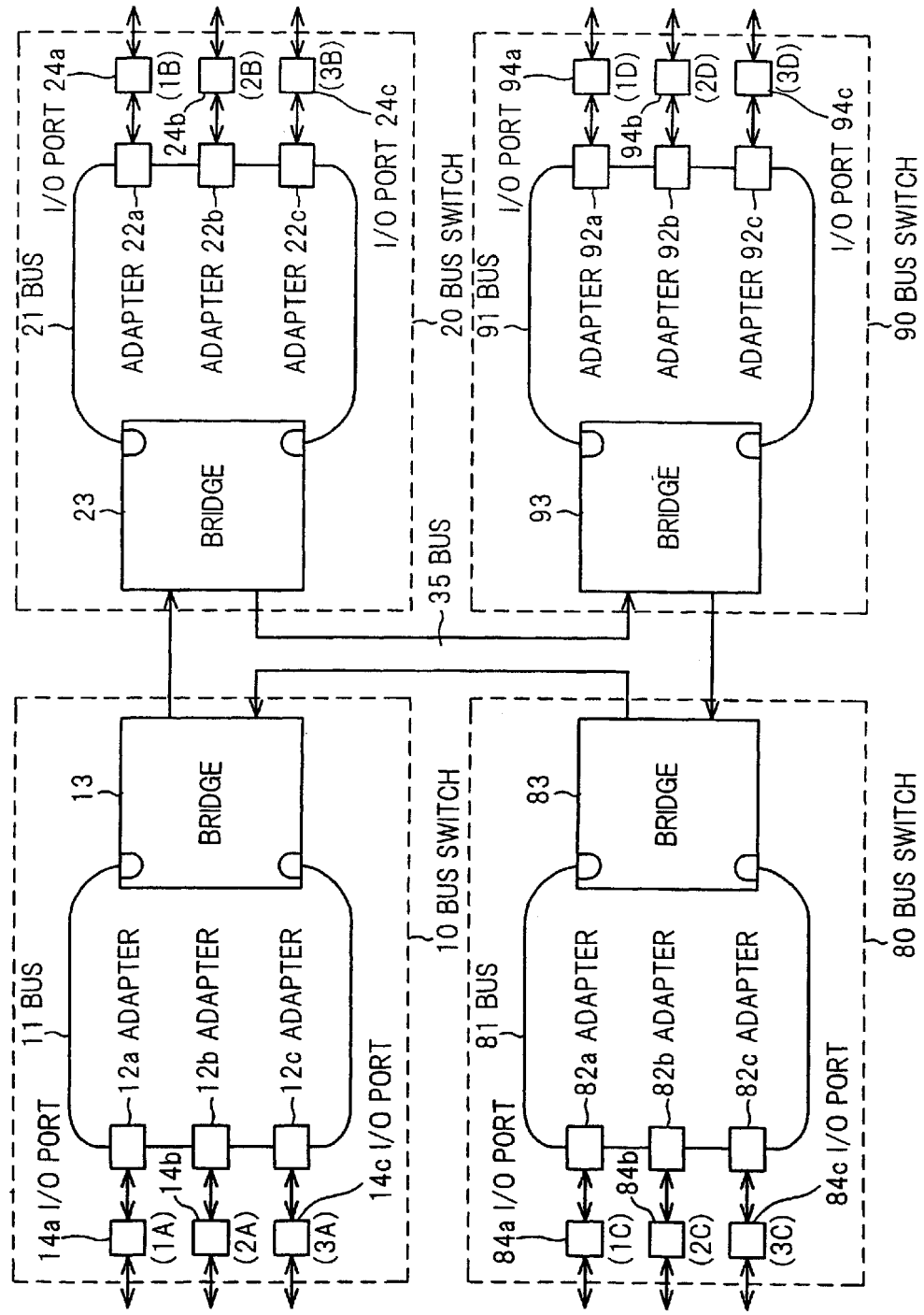
FIG. 12 is a block diagram showing a bus switch system in a third preferred embodiment according to the invention.
Figure 15:
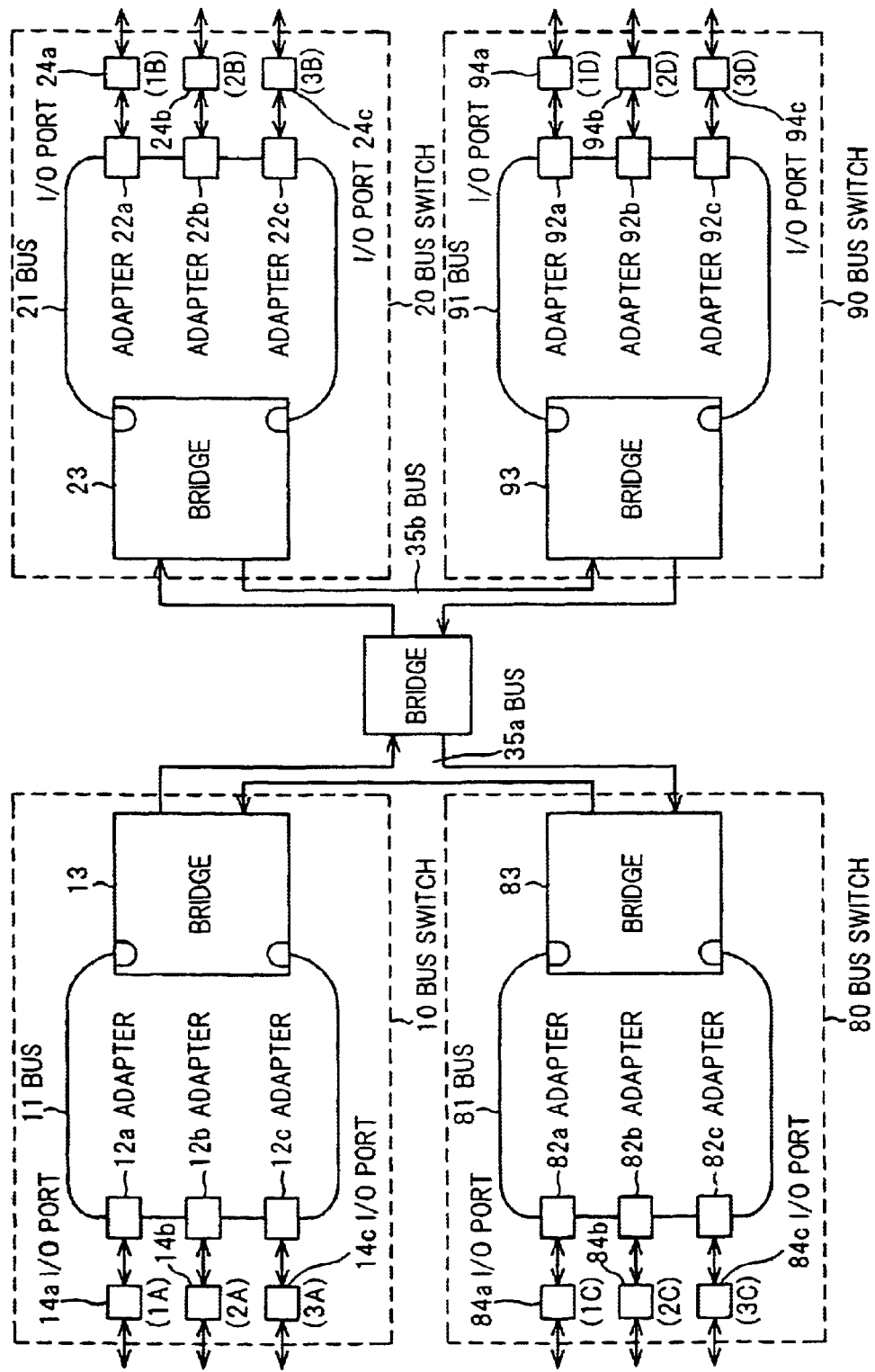
FIG. 15 is a block diagram showing a bus switch system in a fifth preferred embodiment according to the invention.

The input register 201 holds data input from the bus 11, and outputs it to the input FIFO memory 204. The input FIFO memory 204 writes data input from the input register 201 by first-in first-out. The token generator 205, when the number of bridges increases as shown in FIGS. 12 and 15 explained later, adds a signal to identify one of receive-side bridges, or rewrites the address of I/O port into an address to indicate the bridge (when there is only one bridge to the destination, the processing of the token generator 205 is not necessary). To the selection 206, data through the token generator 205 or data from the selector 211 is input. The output register 207 holds data input from the selector 206, and then outputs it to the bus 30. The FIFO controllers 205 and 215 control the input FIFO memories 204 and 213, respectively, to conduct the speed adjustment and the waiting between the bus 11 and the bus 30, and, when data in the FIFO memory is in full state, output a back pressure signal (BPS) to inform that no data can be currently received of the source of data, to the pre-stage adjacent adapter and the bridge of the other party being connected.

The data extract/insert circuit 309 judges whether data input from the bus 11 is to be transferred to the bus 30 or not. If judged it is to be transferred, it transfers the data to the bus 30 and inserts data into a time slot transmittable when the data is sent from the bus 30 to the bus 11. The input register 210 holds data from the bus 30, and then outputs it to the selector 211 and destination confirm circuit 212. The selector 211 outputs the input data to the selector 206 or the output FIFO memory 213 according to the instructions of the 209. When the selector 206 is selected, the data from the bus 30 is not transferred to the bus 11 but returned to the bus 30. Namely, the input register 210, output register 207 and selectors 211 and 206 function as a bypass circuit. The destination confirm circuit 212 confirms whether the flag (EXT FLG) of header is set or not, and the result is output to the FIFO controller 215. The output FIFO memory 213 writes data from the selector 211 by first-in first-out.

Figure 6:
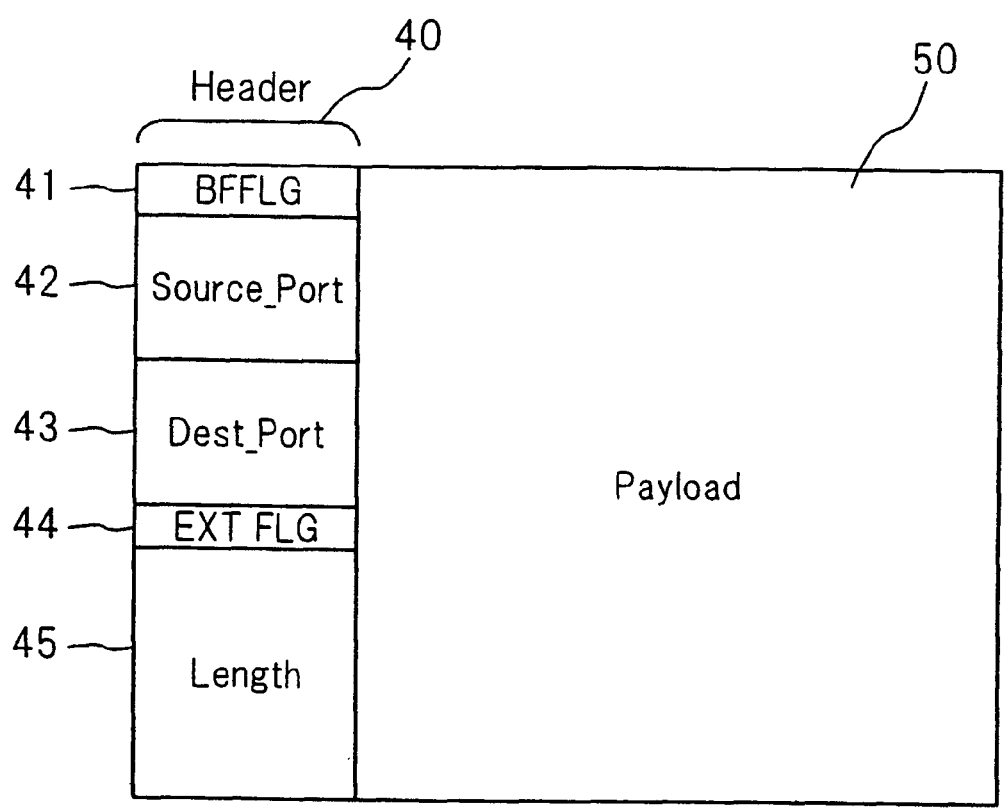
FIG. 6 is an explanatory diagram showing a data format for the bus switch in the first embodiment.

FIG. 6 shows the format of transferred data. In FIG. 6 one frame is composed of a header 40 and a payload 50 to indicate the content of data transferred actually. The vertical direction in FIG. 6 corresponds to the bit width, e.g. 32 bits. The header is composed of five fields, which are BFFLG 41 that is a flag to indicate whether the header is obtainable or not, i.e., in busy state or in free state. Source Port 42 to indicate the source of data. Dest Port 43 to indicate the destination of data. EXT FLG 44 to instruct the transfer to the neighboring bus, the Length 45 to indicate the length of data transferred. In transferring data, the transmit-side always adds the header 40 to the head of frame and the data to be transferred follows the header 40. In this way, the receive-side can confirm whether the data is sent to itself or not by analyzing the header 40. Meanwhile, on the buses 11, 21 and 30, when no data is transferred, only the header 40 with BFFLG 41 that is set to be in free state is transferred between registers.

Data flow in the bus switch and data flow between the bus switches in FIG. 3 are explained below.

(1) Data flow on the bus 11 of the bus switch 10.

Here, it is assumed that data is sent from the I/O port 14a to the I/O port 14c. Also, it is given that at this time no data transfer is conducted from any I/O port on the bus 11. In this case, on the bus 11, only the header 40 (with BFFLG 41 in free state) having no Payload 50 in FIG. 6 circulates with the system clock cycle (part with the Payload 50 removed is in no-signal state). First, the adapter 12a converts serial data input from the I/O port 14a into parallel data, changes the BFFLG 41 of the header 40, which is taken into the adapter 12a from the bus 11, from free state to busy state, adds the changed header 40 to the head of the data from the I/O port 14a, then outputs it from the output register 103a to the bus 11. Then, the transferred data is stored into the input register 201 of the bridge 13. Prior to this transferring, in the header 40, address 1A of the I/O port 14a is assigned to the Source Port 42 and address 3A of the I/O port 140 is assigned to the Dest Port 43. The data with the header 40 added by the adapter 12a is sent through the bus 11 to the bridge 13. It is assumed that the I/O ports 14b, 14c do not transmit/receive any data synchronizing with the timing of the above transferring. In this state, on the bus 11, the header 40 (with BFFLG 41 set in free state) having no Payload 50 is output from the output registers 103b, 103c to the bus 11. The transferred data is stored through the output register 103a into the input register 201a of the bridge 13, stored into the output register 203a at the next system clock, then stored through the bus 11 into the input register 101c of the adapter 12c at the system clock after next. Thus, on the bus 11 of the bus switch 10, the header 40 with the Payload 50 is passed through the output register of adapter and bridge every time the system clock is renewed. In this case, the bridge 13 conducts only the transfer operation that sends data to the bus 11. The adapter 12c receiving the data deletes the header 40 added to the data, converts only the data content into serial data, then outputs it to the I/O port 14c.

In this data transfer, between the data with header output from the adapter 12a and the header (having no data) output from the adapter 12b, there is an interval of bit length (e.g., θ word-8×32 bit length) of input/output register of each adapter. Also, between the headers (having no data) output from the adapters 12b, 12c, there is an interval corresponding to the sum of the bit length of input/output register of each adapter and the bit length of Payload 50.

(ii) Data Flow Between the Bus Switches

The case of transferring data from the bus switch 10 to the bus switch 20 through the bus 30 is explained below.

For example, when data is sent from the I/O port 14a of the bus switch 10 to the I/O port 24c of the bus switch 20, the data sent through the route in the order of the I/O port 14a, bus 11 and bridge 13 is stored into the input register 201a of the bridge 13. Then, the data is output from the input register 201a to the bus 30 at the timing of the next system clock. After that, the data is, in the reverse sequence, sent to the I/O port 24c through the route in the order of the bridge 23, bus 21, adapter 22a, adapter 22b and adapter 22c.

(iii) Modification of the Data Transfer (i) Aforementioned

In the data transfer (i) aforementioned, the eight registers of input/output register 101a to 101c, 103a to 103c of the adapters 12a, 12b and 12c of the bus switch 10 and the input/output registers 201a, 203a of the bridge 13 include some registers having no data stored at any timing, since there is an interval between transferred data as described in (i) aforementioned.

As a modification of such a data transfer form, the eight registers may store the transferred data at any time, so that the transferred data can circulate through the eight registers as if they compose a ring shift register. Thereby, the efficiency of data transfer can be further enhanced.

Figure 7A:
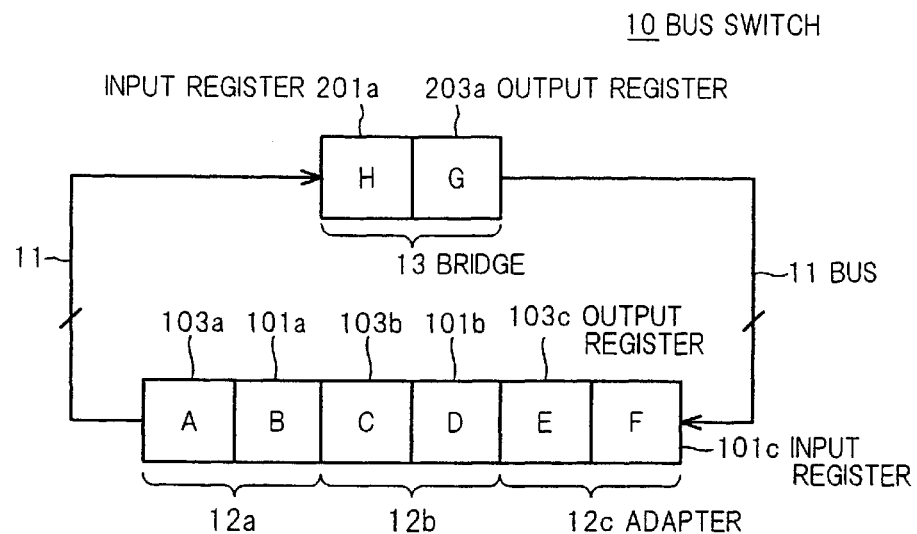
FIG. 7A is an explanatory diagram showing a shift register that is composed of multiple registers connected in ring form on the bus.

FIG. 7A shows the composition of the ring shift register above. The eight registers 103a, 101a, 103b, 101b, 103c, 101c, 201a and 203b store data with header A, B, C, D, E, F, G and H, respectively, and the respective data are circulated according to the shift clock.

Figure 7B:
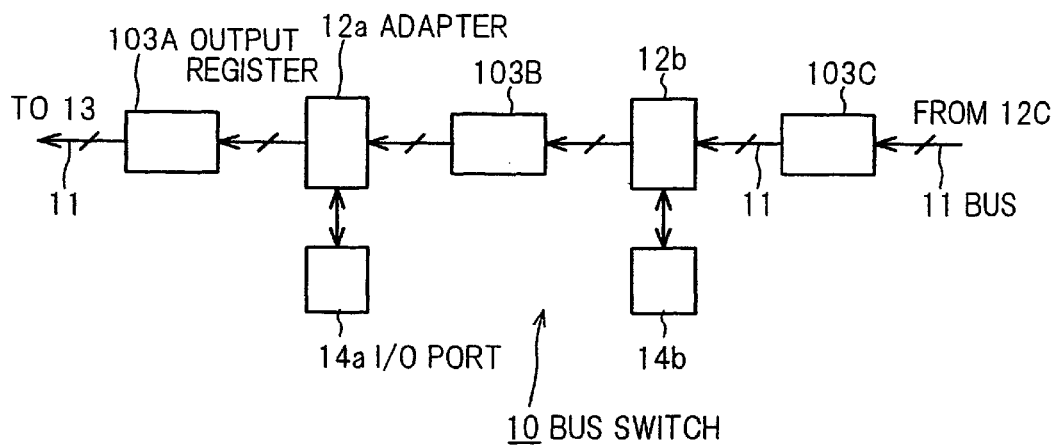
FIG. 7B is an explanatory diagram showing a modification of bus switch in the first embodiment.

FIG. 7B shows a modification of the bus switch 10. From the adapters 12a, 12b and 12c and the bridge 13, the input/output registers 101a to 101c, 103a to 103c, 201a and 203a are removed, and, instead of these, 32 bits×8 words transfer registers (only 103A, 103B and 103C are shown) are inserted into the bus 11 between the adapters 12a, 12b and 12c and between the adapter 12a or 12c and the bridge 13. In this composition, the data transfer between adapters and between adapter and bridge can be performed at one clock cycle. Thereby, the delay from the start to end of transfer can be reduced. As an alternative, instead of using the transfer registers, either of the input and output registers in each of the adapters and bridge may be used as a transfer register. Thereby, the same effect can be obtained.

The operation of the adapter in FIG. 4 and the bridge in FIG. 5 is explained in detail below, taking a case that the data transfer is conducted from the I/O port 14c of the bus switch 10 through the bus 30 to the I/O port 24b of the bus switch 20 in FIG. 3.

Figure 8:
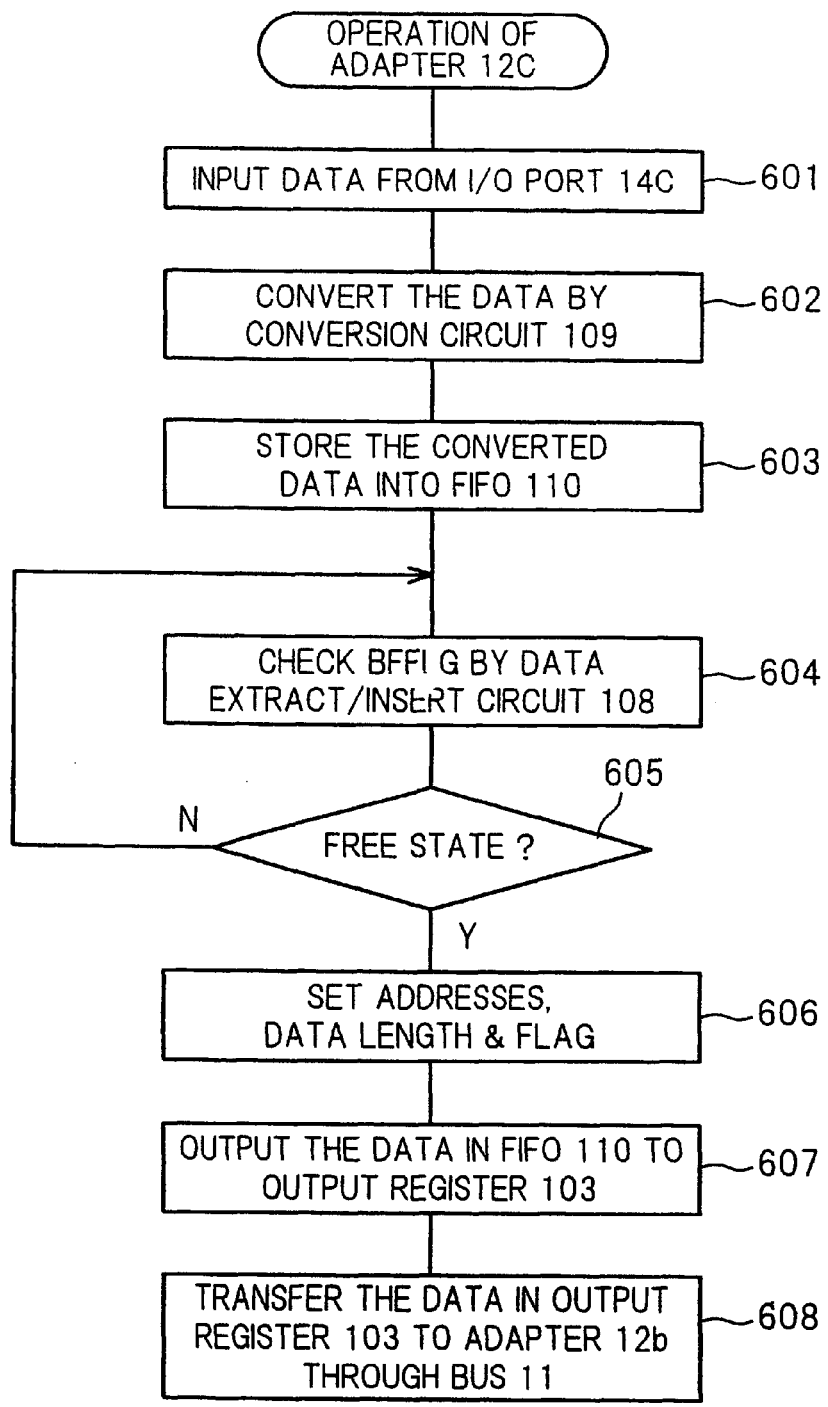
FIG. 8 is a flow chart showing the operation of the adapter in the first embodiment.
Figure 9:
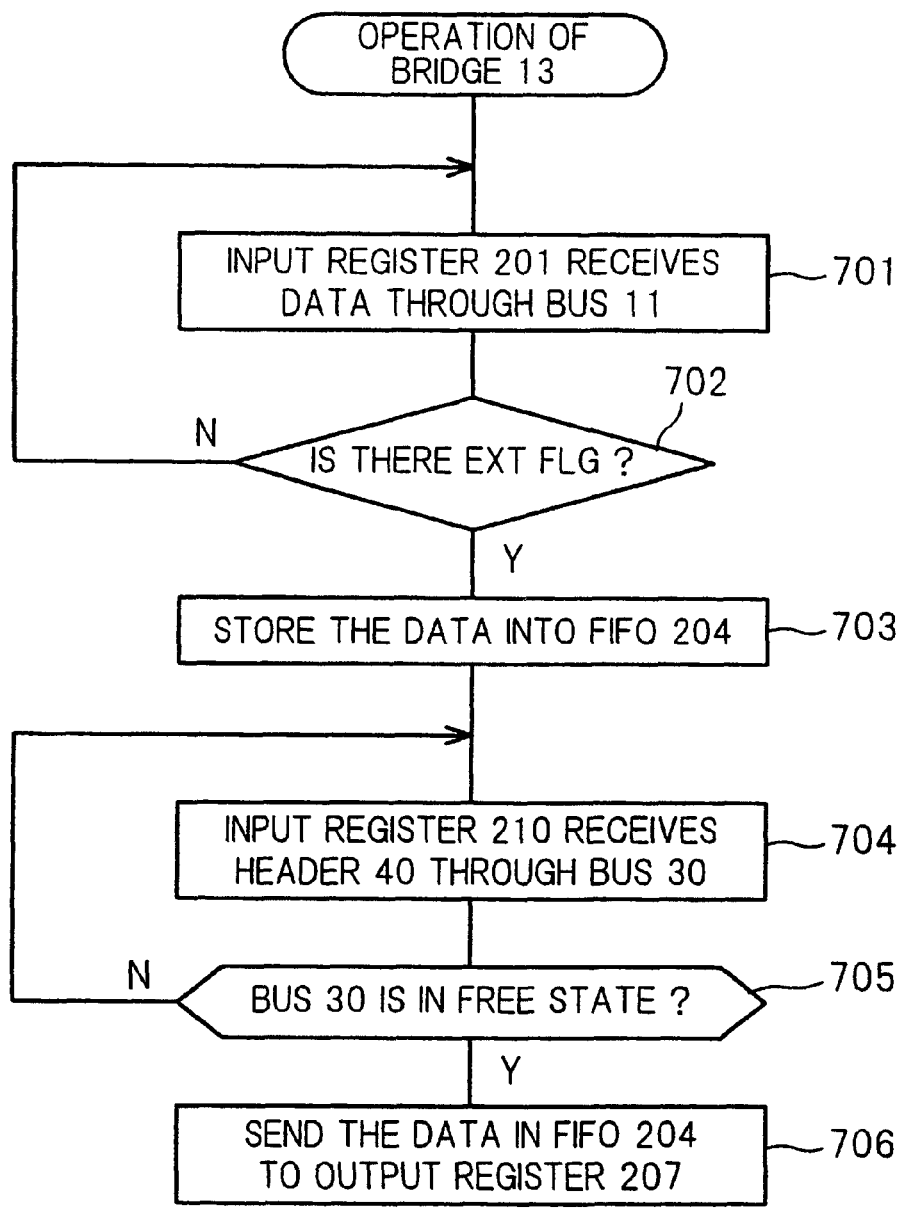
FIG. 9 is a flow chart showing the operation of the transmit-side bridge in the first embodiment.
Figure 10:
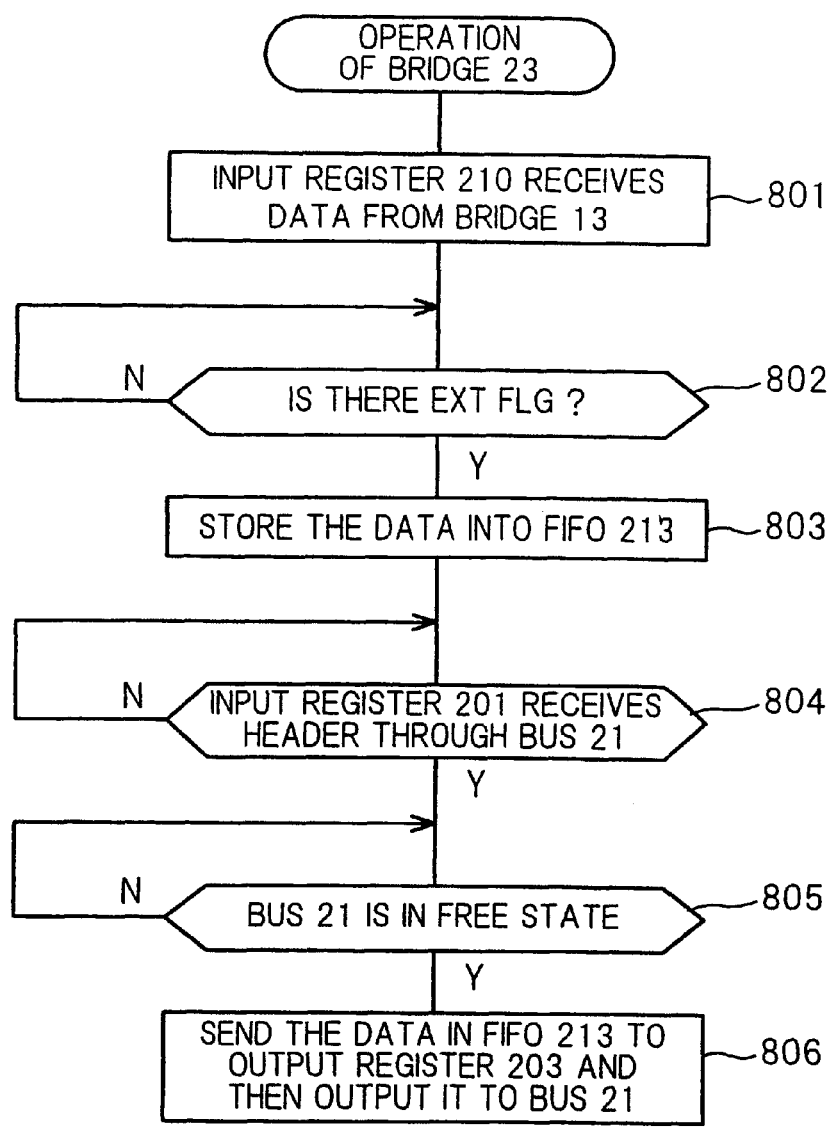
FIG. 10 is a flow chart showing the operation of the receive-side bridge in the first embodiment.

FIG. 8 shows the operation of the adapter. Also, FIG. 9 shows the operation of the transmit-side bridge and FIG. 10 shows the operation of the receive-side bridge. With reference to FIGS. 8 to 10 and FIGS. 3 to 6, the operation of the bus switch according to the invention is explained. Meanwhile, it is assumed that at the beginning, the buses 11, 21 and the bus 30 are in free state.

Addresses 1A, 2A and 3A are assigned to the I/O ports 14a, 14b and 14c, respectively, so as to identify each of them. Also, addresses 1B, 2B and 3B are assigned to the I/O ports 24a, 24b and 24c, respectively, so as to identify each of them.

When data is transferred from the I/O port 14c to the I/O port 14a, through the route in the order of a terminal unit (not shown) connected with the I/O port 14c and the I/O port 14c, the data to be transferred is input to the adapter 12c (step 601). In the adapter 12c, as shown in FIG. 4, the data from the I/O port 14 (14c in FIG. 3) is taken in the S/P conversion circuit 109, which converts it into parallel data available to the bus 11 (step 602). The parallel data converted is stored into the output FIFO memory 110 for transmit-waiting (step 603). On the other hand, when the input register 101 receives a header from the upstream adapter, the data extract/insert circuit 108 checks whether the BFFLG 41 is in free state or in busy state (step 604). If the BFFLG 41 is in free state (step 605), the header add circuit 111 changes the BFFLG 41 of the header 40 from free state to busy state, sets address 3A into the Source Port 42, sets address 2B indicating the destination address into the Dest Port 43, sets the length of data to be transferred into the Length 45, and sets the EXT FLG 44 (step 606). The header 40 thus produced is output to from the header add circuit 111 to output register 103 at the time when the selector 102 switches to the header add circuit 111 side. Subsequently, the data stored in the output FIFO memory 110 is transferred to the output register 103, further sent to the bus 11 (step 607). Thus, the data output from the output register 103 to the bus 11 reaches the adapter 12a through the adapter 12b (step 608).

As shown in FIGS. 9 and 5, in the bridge 13, the input register 201 (step 701) receives data from upstream of the bus 11, and holds it. The data extract/insert circuit 209 checks the EXT FLG 44 in the data received by the input register 201. If judged the flag is set (step 702), the data in the input register 201 is stored into the input FIFO memory 204 (step 703). On the other hand, the input register 210 receives the header 40 from the ring bus 30, the data extract/insert circuit 209 checks the BFFLG 41 of the header 40. If judged the bus 30 is in free state (step 705), the data with header received from the bus 11 is read from the input FIFO memory 204, and then sent to the ring bus 30 through the route in the order of the token generator 205, selector 206, output register 207 (step 706). In this case, since the token generator 205 determines the bridge 23 as the destination, the content of the Source Port 42 is re-written into address 4A indicating the bridge 13 from address 3A of the I/O port 14c. As described earlier, if there is no bridge, as the destination, other than the bridge 23, this processing is not necessary.

Also, when data is written into the input FIFO memory 204, the token generator 214 outputs a header 40 with the BFFLG 41 in free state, which is sent through the output register 203 to the bus 11. In this way, at the time when the bridge 13 of address 4A receives the data output from the I/O port 14c of address 3A, the bus 11 in the bus switch 10 becomes in free state, thereby enabling the next transfer.

Data output from the bridge 13 is received by the bridge 23 of the bus switch 20. The operation of the bridge 23 is explained referring to FIGS. 5 and 10. First, data is received from the bridge 13 through the bus 30 (step 801). The destination confirm circuit 212 checks whether the EXT FLG 44 of header 40 is set or not (step 802). If the EXT FLG 44 is set, it is written into the output FIFO memory 213 (step 803). Thereafter, when the data extract/insert circuit 209 receives the header flowing the bus 21 (step 804), the data extract/insert circuit 209 checks the BFFLG 41. In the check of BFFLG 41, if judged the bus 21 is in free state (step 805), the header 40 and data stored in the output FIFO memory 213 is read and sent to the bus 21 (step 806). In this case, the token generator 214 rewrites the Source Port 42 into address 2B of the I/O port 24b from address 4B of the bridge 23 (when a bridge to receive it is only the bridge 23, this processing is not necessary). Also, like the case of the bridge 13, at the time when the data transfer to the output FIFO memory 213 is completed, a header 40 with BFFLG 41 in free state is sent to the bus 30 connecting between the bridges. Thereby, the bus 30 between the bridges can be released before the data reaches the I/O port 24b that is the original destination.

Then, the header 40 and data output to the bus 21 in the bus switch 20 reach the I/O port 24b through the adapter 22a then 22b. When the adapter 22b detects that the transferred data is addressed to itself from the header 40 received, it extracts the data received and stores it into the input FIFO memory 105 in FIG. 4. Then, the P/S conversion circuit 106 converts the data read from the input FIFO memory 105 into serial data available to the I/O port 24b, and then outputs it to the I/O port 24b. Also in this case, like the operation of the bridge 13, when the reception of data by the output FIFO memory 213 is completed, the BFFLG 41 of header 40 is changed into free state and the header 40 changed is sent to the bus 21.

As described above, according to the invention, the data transfer can be conducted while allowing the three buses 11, 30 and 21 to operate independently and each of them to be subjected to the bridging.

Figure 11:
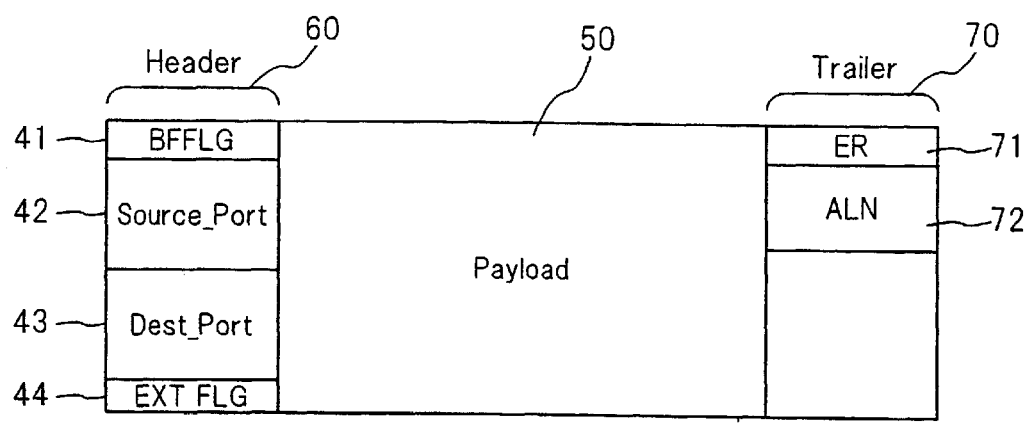
FIG. 11 is an explanatory diagram showing a data format in a second preferred embodiment.

FIG. 11 shows a data format in the second preferred embodiment according to the invention. As shown in FIG. 11, a header 60 is composed of four fields. The header 60 does not have the Length 45, and Trailer 70, instead of the Length 45, follows the Payload 50. The Trailer 70 has a field of ER 71 and field of ALN 72. The ER 71 indicates the validity of data transferred. For example, when there is an error in the process of data transfer, the ER 71 can be used to inform the other party subject to the data transfer about the occurrence of error. Also, the ALN 72 indicates up to where the final word of the Payload 50 data exists. For example, in case of 32-bit wide bus, it indicates up to where, of 4 bytes, valid data to be transferred exists.

In the first embodiment, for all data transferred, the length (Length 45) of data, which is detected when the data is input to the transmitting FIFO memory, is written into the header. Therefore, the data transfer does not start before the entire data transferred is input into the transmitting FIFO memory. In contrast, in the second embodiment, the data transfer starts immediately the data reaches the transmitting FIFO memory. This is enabled by adding the Trailer 70 that indicates whether there is an error thus far or not and the data effective area up to the final word at the time when the data transfer up to the final word is completed. Therefore, even without the Length 45 in header, the adapter subject to the data transfer can start to transfer the data immediately the data is input to the FIFO memory since the effective data area is known. Also, in the second embodiment, the transfer delay can be reduced to shorter than that in the first embodiment. Further, since it is not necessary to store the entire data transferred into the transmitting/receiving FIFO memory, the memory capacity of FIFO can be reduced. Namely, the hardware scale can be reduced.

FIG. 12 shows a bus switch system in the third preferred embodiment according to the invention. In FIG. 12, the BPS in FIG. 3 is omitted. The system in the third embodiment is composed of four bus switches having the same composition. Namely, in addition to the bus switches 10 and 20, bus switches 80 and 90 are provided. Thus, in FIG. 12, like parts are indicated by like reference numerals as used in FIG. 3 and the explanation thereof is omitted here.

The bus switch 80 has the same composition as the bus switch 10, and the bus switch 90 has the same composition as the bus switch 20. A bus 91 corresponds to the bus 11, adapters 82a, 82b and 82c correspond to the adapters 12a, 12b and 12c, a bridge 83 corresponds to the bridge 13. I/O ports 84a, 84b and 84c correspond to the I/O ports 14a, 14b and 14c. A bus 91 corresponds to the bus 21, adapters 92a, 92b and 92c correspond to the adapters 22a, 22b and 22c, a bridge 93 corresponds to the bridge 23. I/O ports 94a, 94b and 94c correspond to the I/O ports 24a, 24b and 24c. A ring bus 35 is connected so that circulates the bridges 13, 23, 93 and 83. The bus switches 10, 20, 80 and 90 allows the data transfer from an I/O port connected with one of them to a designated I/O port of the bus switch. Here, it is given that the addresses of I/O ports 84a, 84b and 84c are 1C, 2C and 3C and the addresses of I/O ports 94a, 94b and 94c are 1D, 2D and 3D.

With the composition in FIG. 12, when data is sent (transferred) from the I/O port 14a (address 1A) to the I/O port 94b (address 2D) of the bus switch 90, it reaches the target I/O port 94b through the route in the order of the bus 11 of the bus switch 10, bridge 13, ring bus 35, bridge 23 and bridge 93.

Figure 13:
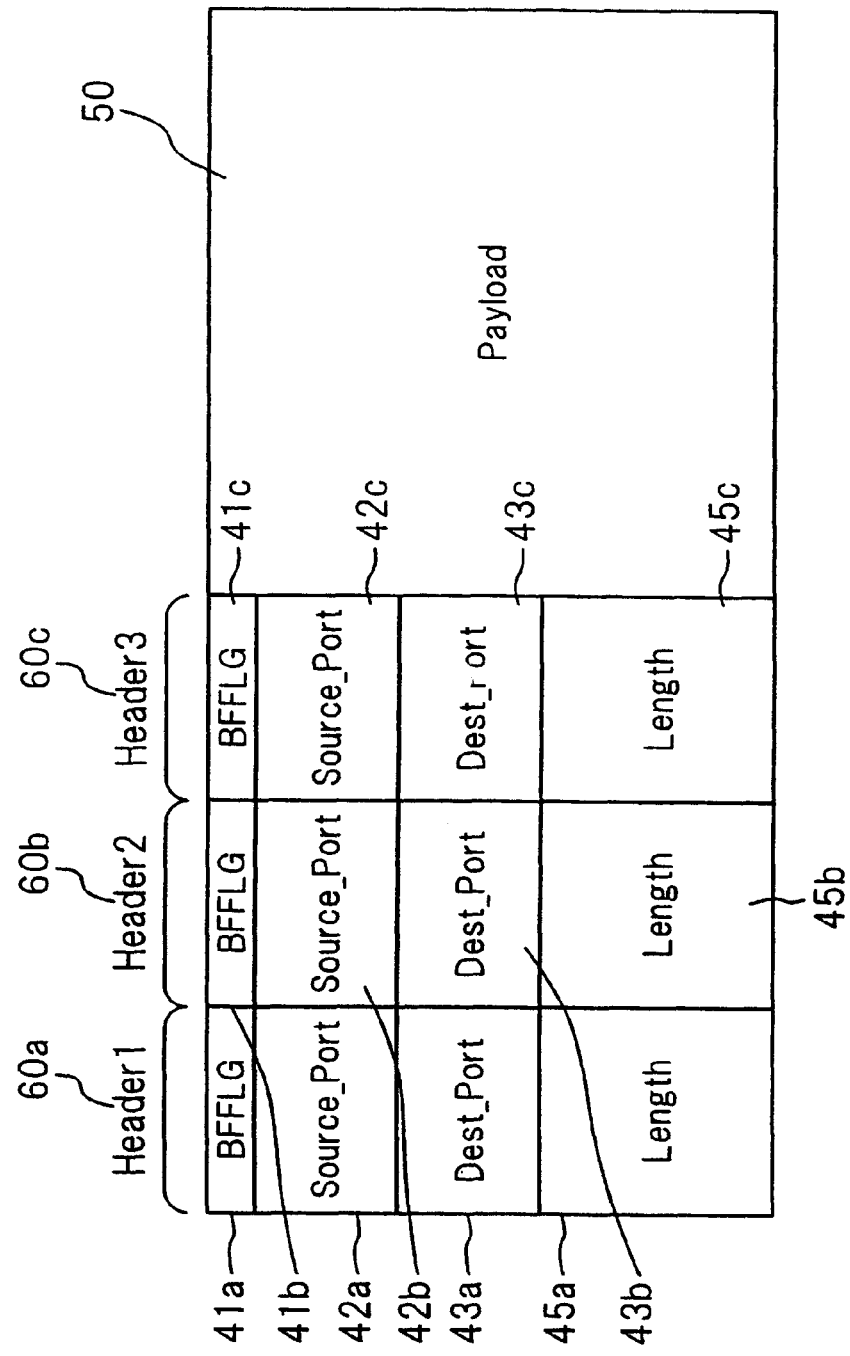
FIG. 13 is an explanatory diagram showing a data format in the third preferred embodiment.

FIG. 13 shows a data format for the composition in the third embodiment in FIG. 12. In the data format in FIG. 13, headers necessary for the respective ring buses are in advance prepared by the adapter 12a so as to add them to the head of data. Namely, in case of passing through three ring buses, three headers, in which the EXT FLG 44 is removed, 60a (DFFLC 41a+Source Port 42a+Dest Port 43a–Length 45a), 60b (BFFLG 41b+Source Port 42b+Dest Port 43b–Length 45b, and 60c (BFFLG 41c+Source Port 42c+Dest Port 43c+Length 45c) are added to the head of the data (other field of the data format part is the same as that in FIG. 6). Meanwhile, in case of the data length unified in all the I/O ports, only one Length is needed and the Lengths 45b and 45c may be therefore omitted.

The operation of the system in the third embodiment is explained below.

In transferring data from address 1A, the three headers are added to the head of data. The destination in the header 60a is defined as the bridge 13, the destination in the header 60b is defined as the bridge 93 of the bus switch 90, the destination in the header 60c is defined as address 2D. Since the data output from the I/O port 14a is bound for the bridge 13, it receives the data. At this state, removing the header 60a, the data is written into the input FIFO memory 105. Then, the data is sent through the bridge 23 to the ring bus 35. Since the data is bound for the bridge 93 defined in the header 60b, the bridge 93 receives the data. At this stage, removing the header 60b, the data is written into the output FIFO memory 213. Finally, the data is sent through the adapter 92b to the bus 91. In this case, since the data is bound for address 2D, the I/O port 94b receives the data.

Here, given that the data is transferred in the system in FIG. 12 using the data format in FIG. 6, the data transfer from the bus 10 to the bus connected with the bus 23 can be conducted without causing any problem since the identifier. EXT FLG 44, in the header is used to control whether to conduct the bridging to the neighboring bus. However, since it is not shown which bridge is to receive the data, all the bus switches 20, 80 and 90 receive the data and then send it to the buses 21, 81 and 91, respectively. Here, since only the bus 91 has the destination, the other buses 21 and 81 not having the destination do not receive the data. Therefore, the data will infinitely circulate in the buses 21 and 81.

So, with the bridges 23, 83 discarding the data returned through one cycle, the data can be prevented from circulating infinitely. However, since the data is transferred to the buses 21, 81 to which the data is essentially unnecessary to send, the transfer efficiency must lower due to such an unnecessary data flow in the respective buses. In contrast, in the third embodiment, the data is transferred to only the buses on the way to the destination. Therefore, the transfer efficiency becomes higher than that in the first embodiment.

Figure 14:
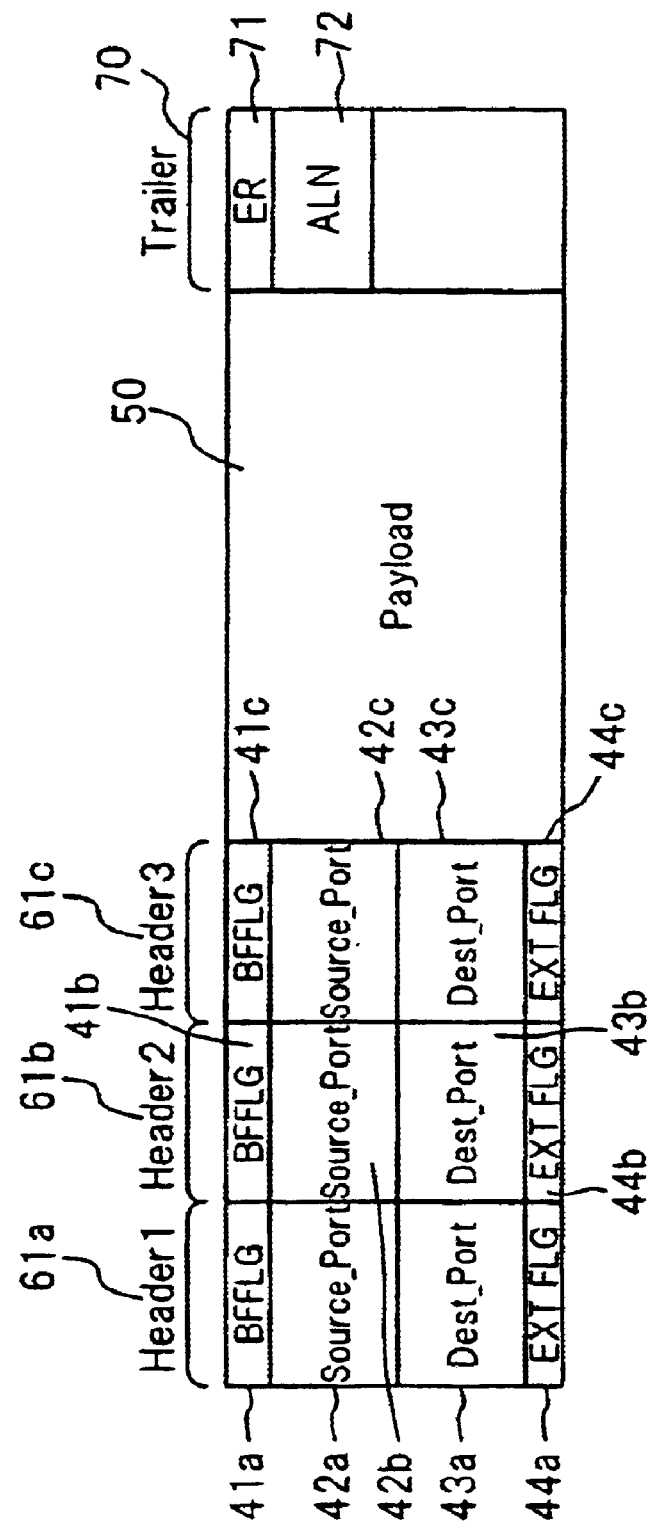
FIG. 14 is an explanatory diagram showing a data format in a fourth preferred embodiment.

FIG. 14 shows a data format in the fourth preferred embodiment according to the invention. This embodiment is given combining the second embodiment and the third embodiment. Namely, three headers of Header 1 61a, Header 2 61b and Header 3 61c that the Length 45 is removed from the header 40 in FIG. 6 are combined with the Payload 50 and Trailer 70 in FIG. 10. The number of headers is set to be the same as the number of buses to be passed through up to the final destination, and the nearer the next destination the header is the further outside the header is located. The Trailer 70 can be shared among the headers, therefore it only has to be one. The characteristic of the fourth embodiment is that, having the advantage of both the second and third embodiments, the transfer delay can be reduced and the transfer efficiency can be enhanced without unnecessary data transfer.

FIG. 15 shows a bus switch system in the fifth preferred embodiment according to the invention. In FIG. 15, the BPS in FIG. 3 is omitted. In this embodiment, the bus switches 10 and 80 in FIG. 12 are connected in ring form by a ring bus 35a, the bus switches 20 and 90 in FIG. 12 are connected in ring form by a ring bus 35b, and the ring buses 35a and 35b are connected by a bridge 100. Although in this embodiment the two bus switches on the right and left sides, respectively, are connected by the bridge 100, this invention is not limited to this number, two. The number of bus switches can be optioned according to the number of I/O ports connected.

With the composition in the first embodiment, as the number of I/O ports increases, the number of bridges which are connected with the bus 30 between the bridges for connecting its bus has to increase. Therefore, the transfer bandwidth of the bus 30 between the bridges may become short. In contrast, with the composition in FIG. 15, the bus between the bridges has the hierarchical structure, and are divided into the multiple ring buses 35a, 35b. Therefore, even when the number of I/O ports and bridges connected there increases, the number of adapters and I/O ports connected by the bus in one bus switch does not increase so much. Thus, the data transfer can be conducted more efficiently.

Advantages of the Invention

In the adapter according to the invention, the input/output registers of the adapter in cascade connection on the data transferring bus compose a shift register. Thus, since the data is allowed to be transferred to the adjacent adapter at one clock cycle, the clock rate in data transfer can be made faster. Also, the data transfer is conducted in one direction and the input/output control is optimally conducted by the control means. Therefore, the switch control in data transfer can be made easier. Further, the data taken in from the input/output register is temporarily held by the input/output storing means. This allows the data flow independent of the processing speed of module and subject to the wait processing. Therefore, the data transfer can be sped up and the data can be output efficiently. Also, even when the data processing speed of each module cannot follow the data transfer amount, it is not necessary to reduce the data transfer speed.

In the bridge according to the invention, the input/output registers in cascade connection on the first data transferring bus compose a shift register. Also, the first and second bridging registers in cascade connection on the second data transferring bus compose a shift register. Thus, since the data is allowed to be transferred to the adjacent adapter at one clock cycle, the clock rate in data transfer can be made faster. Also, the data transfer is conducted in one direction and the input/output control is optimally conducted by the control means. Therefore, the switch control in data transfer can be made easier. Further, by holding the data using the input/output storing means, the transfer processing between the buses is conducted in good timing. Therefore, the data transfer can be sped up and the data can be output efficiently. Also, through the bridge and the second data transferring bus, the modules can be distributed to the other data transferring buses. So, even when the number of modules connected to the first data transferring bus increases, the transfer bandwidth of each module does not reduce, therefore the data transfer speed does not lower. Also, even when the data processing speed of each module cannot follow the data transfer amount, it is not necessary to reduce the data transfer speed.

In the bus switch according to the invention, the input/output registers of the adapter in cascade connection on the data transferring bus compose a shift register. Thus, since the data is allowed to be transferred to the adjacent adapter at one clock cycle, the clock rate in data transfer can be made faster. Also, the data transfer is conducted in one direction and the input/output control is optimally conducted by the control means. Therefore, the switch control in data transfer can be made easier. Further, the data taken in from the input/output register is temporarily held by the input/output storing means. This allows the data flow independent of the processing speed of module and subject to the wait processing. Therefore the data transfer can be sped up and the data can be output efficiently. Also, even when the data processing speed of each module cannot follow the data transfer amount, it is not necessary to reduce the data transfer speed.

In the bus switch system according to the invention, with the bridge, the input/output registers in cascade connection on the first data transferring bus compose a shift register. Also, the first and second bridging registers in cascade connection on the second data transferring bus compose a shift register. Thus, since the data is allowed to be transferred to the adjacent adapter or bridge at one clock cycle, the clock rate in data transfer can be made faster. Also, the data transfer is conducted in one direction and the input/output control is optimally conducted by the control means. Therefore, the switch control in data transfer can be made easier. Further, by holding the data using the input/output storing means, the transfer processing between the buses is conducted in good timing. Therefore, the data transfer can be sped up and the data can be output efficiently. Also, through the bridge and the second data transferring bus, the modules can be distributed to the other data transferring buses. So, even when the number of modules connected to the bus increases, the transfer bandwidth of each module does not reduce, the overall bandwidth of the bus switch is not limited by the first data transferring bus, therefore the data transfer speed does not lower. Also, even when the data processing speed of each module cannot follow the data transfer amount, it is not necessary to reduce the data transfer speed.

In the bus switch system according to the invention, with the adapter, the first input and first output registers in cascade connection on the data transferring bus of bus switch compose a shift register. Also, with the bridge, the second input and second output registers in cascade connection on the first data transferring bus compose a shift register. Thus, since the data is allowed to be transferred to the adjacent adapter at one clock cycle, the clock rate in data transfer can be made faster. Also, the data transfer on the first and second data transferring buses is conducted in one direction and the input/output control is optimally conducted by the first and second control means. Therefore, the switch control in data transfer can be made easier. Further, the data taken in from the first and second input/output registers is temporarily held by the first and second input storing means. Therefore, the data transfer can be sped up independently of the processing speed of module. Also, since the data from module is temporarily held by the output storing means, the data can be output efficiently according to the situation of the first and second data transferring buses. Further, even when the number of modules connected to the first data transferring bus comes to the limit, arbitrary number of buses can be connected each other through the bridge and the second data transferring bus. Thus, the number of modules can be increased freely without lowering the transfer speed. Also, even when the data processing speed of each module cannot follow the data transfer amount, it is not necessary to reduce the data transfer speed.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A bus switch adapter for conducting data selected from a data taking operation that extracts data being transferred on a data transferring bus to take the data into a module such as an operating circuit and a transmit/receive circuit, a data inserting operation that inserts data output from said module into said data transferring bus, and a data transferring operation that transfers data on said data transferring bus without conducting the extracting and inserting of data, comprising:

an input register to which parallel data with a given number of bits to be transferred on said data transferring bus in input and which holds the data, said input register being of a given number of parallel bits;

an output register that holds parallel data with a given number of bits and outputs the data to said data transferring bus, said output register being of a given number of parallel bits;

an input storing means that temporarily stores the parallel data held by said input register and outputs the data to said module at a given timing;

an output storing means that temporarily stores the data output from said module and outputs the data, as the parallel data, to said output register at a given timing; and a control means that controls the outputting of the parallel data from said input register to said input storing means, the outputting of the parallel data from said output storing means to said output register, and the outputting of the parallel data from said input register to said output register, wherein the input register is directly connected to the output register through the control means.

2. A bus switch adapter, according to claim 1, wherein:

said input register and said output register are composed of a flip flop; and said input storing means and said output storing means are composed of an FIFO memory.

3. A bus switch adapter, according to claim 1, wherein:

said control means comprises a converting means that conducts the serial/parallel conversion of data to be transferred to/from said module, a controller that controls said input storing means and said output storing means, and a data extract/insert circuit that, when judged data is to be transferred from said data transferring bus to said module, transfer the data from said data transferring bus to said module, and controls the data transfer from said module to said data transferring bus.

4. A bus switch bridge for conducting one selected from a data taking operation that extracts data being transferred on a first data transferring bus to take the data into a second data transferring bus, a data inserting operation that inserts data taken from said second data transferring bus into said first data transferring bus, a data transferring operation that transfers data on said first data transferring bus without conducting the extracting and inserting of data, and a data returning operation that sends data taken from said second data transferring bus back to said second data transferring bus, comprising:

an input register to which parallel data with a given number of bits to be transferred on said first data transferring bus in input and which holds the data, said input register being of a given number of parallel bits;

an output register that holds parallel data with a given number of bits and outputs the data to said first data transferring bus, said output register being of a given number of parallel bits;

an input storing means that temporarily stores the parallel data held by said input register and outputs the data to a first bridge register connected to said second data transferring bus at a given timing;

an output storing means that temporarily stores the data output from a second bridge register connected to second data transferring bus and outputs the data, as the parallel data, to said output register at a given timing; and a control means that controls the outputting of the parallel data from said input register to said input storing means, the outputting of the parallel data from said output storing means to said output register, and the outputting of the parallel data from said second bridge register to said first bridge register.

5. A bus switch bridge, according to claim 4, wherein:

said input register, said output register, said first bridge register and said second bridge register are composed of a flip flop; and said input storing means and said output storing means are composed of an FIFO memory.

6. A bus switch for extracting data being transferred on a data transferring bus to input the data through an adapter to a module such as an operating circuit and a transmit/receive circuit, and for inserting data output from said module into said data transferring bus through said adapter, wherein said adapter comprises:

an input register to which parallel data with a given number of bits to be transferred on said data transferring bus is input and which holds the data, said input register being of a given number of parallel bits;

an output register that holds parallel data with a given number of bits and outputs the data to said data transferring bus, said output register being of a given number of parallel bits;

an input storing means that temporarily stores the parallel data held by said input register and outputs the data to said module at a given timing;

an output storing means that temporarily stores the data output from said module and outputs the data, as the parallel data, to said output register at a given timing; and a control means that controls the outputting of the parallel data from said input register to said input storing means, the outputting of the parallel data from said output storing means to said output register, and the outputting of the parallel data from said input register to said output register, wherein the input register is directly connected to the output register through the control means.

7. A bus switch, according to claim 6, wherein:

said control means comprises a converting means that conducts the serial/parallel conversion of data to be transferred to/from said module, a controller that controls said input storing means and said output storing means, and a data extract/insert circuit that, when judged data is to be transferred from said data transferring bus to said module, transfer the data from said data transferring bus to said module, and controls the data transfer from said module to said data transferring bus.

8. A bus switch, according to claim 7, wherein:

said data extract/insert circuit, when the writing of data into said input storing means is completed, outputs a header with a flag to indicate that said data transferring bus is in free state to said data transferring bus.

9. A bus switch, according to claim 6, wherein:

said adapter includes a plurality of adapters each of which has said input register and said output register, said plurality of adapters being located to compose a ring-formed shift register through said data transferring bus; and said control means that shifts a plurality of data with header which has a total bit length equal to the entire length of said ring-formed shift register in said ring-formed shift register.

10. A bus switch system for connecting a first data transferring bus and a second data transferring bus through a bridge and for transferring data between said first data transferring bus and said second data transferring bus, wherein said bridge comprises:

an input register to which parallel data with a given number of bits to be transferred on said first data transferring bus is input and which holds the data, said input register being of a given number of parallel bits;

an output register that holds parallel data with a given number of bits and outputs the data to said first data transferring bus, said output register being of a given number of parallel bits;

an input storing means that temporarily stores the parallel data held by said input register and outputs the data to a first bridge register connected to said second data transferring bus at a given timing;

an output storing means that temporarily stores the data output from a second bridge register connected to the second data transferring bus and outputs the data, as the parallel data, to said output register at a given timing; and a control means that controls the outputting of the parallel data from said input register to said input storing means, the outputting of the parallel data from said output storing means to said output register, and the outputting of the parallel data from said second bridge register to said first bridge register.

11. A bus switch system, according to claim 10, wherein:

said control means comprises, a controller that controls said input storing means and said output storing means, and a data extract/insert circuit that, when judged data is to be transferred from said first data transferring bus to said second data transferring bus, transfer the data from said first data transferring bus to said second data transferring bus, and controls the data transfer from said second data transferring bus to said first data transferring bus and controls the data from said second bridge register to be passed toward said first bridge register.

12. A bus switch system for connecting, through a bridge, a first data transferring bus and a second data transferring bus that transfer data to be extracted and inserted from a module such as an operating circuit and a transmit/receive circuit through an adapter, wherein, said adapter comprises: a first input register to which parallel data with a given number of bits to be transferred on said first data transferring bus is input and which holds the data, said first input register being of a given number of parallel bits; a first output register that holds parallel data with a given number of bits and outputs the data to said first data transferring bus, said first output register being of a given number of parallel bits; a first input storing means that temporarily stores the parallel data held by said first input register and outputs the data to said module at a given timing; a first output storing means that temporarily stores the data output from said module and outputs the data, as the parallel data, to said first output register at a given timing; and a control means that controls the outputting of the parallel data from said first input register to said first input storing means, the outputting of the parallel data from said first output storing means to said first output register, and the outputting of the parallel data from said first input register to said first output register, and said bridge comprises: a second input register to which parallel data with a given number of bits to be transferred on said first data transferring bus is input and which holds the data, said second input register being of a given number of parallel bits; a second output register that holds parallel data with a given number of bits and outputs the data to said first data transferring bus, said second output register being of a given number of parallel bits; a second input storing means that temporarily stores the parallel data held by said second input register and outputs the data to a first bridge register connected to said second data transferring bus at a given timing; a second output storing means that temporarily stores the data output from a second bridge register connected to second data transferring bus and outputs the data, as the parallel data, to said second output register at a given timing; and a control means that controls the outputting of the parallel data from said second input register to said second input storing means, the outputting of the parallel data from said second output storing means to said second output register, the outputting of the parallel data from said first input register to said second output register, and the outputting of the parallel data from said second bridge register to said first bridge register.

13. A bus switch system, according to claim 12, wherein:

said adapter further comprises a header adding means that, to data, adds a header composed of a field to indicate whether said first data transferring bus is in free state or in busy state, a field to indicate the source of data, a field to indicate the destination of data, a field to instruct the data transfer toward an adjacent bus, and a field to indicate the length of data transferred.

14. A bus switch system, according to claim 12, wherein:

said adapter further comprises a header adding means that, to data, adds a header composed of a field to indicate whether said first data transferring bus is in free state or in busy state, a field to indicate the source of data, a field to indicate the destination of data, and a field to instruct the data transfer toward an adjacent bus.

15. A bus switch system, according to claim 14, wherein:

said header adding means, to data, adds a trailer to indicate the validity and the amount of data transferred.

16. A bus switch system, according to claim 12, wherein:

said bus switch system comprises a plurality of bus switches composed of said adapter and said bridge, and said bridges of said plurality of bus switches are connected each other in ring form through said second data transferring bus.

17. A bus switch system, according to claim 16, wherein:

said bridge discards data to be returned after one cycle through said second data transferring bus.

18. A bus switch system, according to claim 12, wherein:

said adapter further comprises a header adding means that, when said adapter operates as the source of data, adds a header of the same number as the number of buses passed through up to the destination to the data output from said first output storing means.

19. A bus switch system, according to claim 18, wherein:

said header is composed of a field to indicate whether said first data transferring bus is in free state or in busy state, a field to indicate the source of data, a field to indicate the destination of data, and a field to indicate the length of data transferred.

20. A bus switch system, according to claim 12, wherein:

said second data transferring bus has one group of one or more said bridges connected through said second data transferring bus and a second bridge is inserted between said group and another group.

* * * * *